United States Patent [19]

Dahlin

[11] 4,225,863

[45] Sep. 30, 1980

[54] SIMPLIFIED SYSTEM FOR ESTIMATING PULSE RADAR DOPPLER FREQUENCY

[75] Inventor: Robert K. Dahlin, Garden Grove, Calif.

[73] Assignee: The United States of America as represented by the Secretary of the Army, Washington, D.C.

[21] Appl. No.: 80,907

[22] Filed: Oct. 1, 1979

[51] Int. Cl.³ ..................... G01R 23/02; G01S 13/02; H03K 4/02
[52] U.S. Cl. .................. 343/7.5; 307/233 R; 307/351; 307/356; 307/358; 307/227; 324/78 E
[58] Field of Search ................. 324/78 E; 307/233 R, 307/351, 356, 358, 227; 343/7.5

[56] References Cited

U.S. PATENT DOCUMENTS

| | | |
|---|---|---|
| 3,184,614 | 5/1965 | Harrison, Jr. ..................... 307/227 X |
| 3,258,769 | 6/1966 | Forestier ............................. 343/7.5 |
| 3,617,904 | 11/1971 | Marino ............................. 307/351 X |
| 3,657,657 | 4/1972 | Jefferson ......................... 307/227 X |
| 3,723,771 | 3/1973 | McLean ........................... 307/233 X |
| 3,991,379 | 11/1979 | Chadwick et al. .............. 307/358 X |
| 4,156,202 | 5/1979 | Takahashi ....................... 307/358 X |

Primary Examiner—Malcolm F. Hubler
Attorney, Agent, or Firm—Nathan Edelberg; Robert P. Gibson; Robert C. Sims

[57] ABSTRACT

A method for determining doppler frequency by the measurement of the maximum pulse-to-pulse difference over one doppler cycle. A box-carred (sample-and-hold) phase detector's output is differentiated to obtain pulses whose amplitude represents the amplitude of individual boxcar transitions. The largest pulse amplitude is selected for indication of doppler frequency.

4 Claims, 3 Drawing Figures

SIMPLIFIED SYSTEM FOR ESTIMATING PULSE RADAR DOPPLER FREQUENCY

DEDICATORY CLAUSE

The invention described herein was made in the course of or under a contract or subcontract thereunder with the Government and may be manufactured, used, and licensed by or for the Government for governmental purposes without the payment to us of any royalties thereon.

DESCRIPTION OF THE PREFERRED EMBODIMENT

In a radar the doppler frequency is the change of the received signal carrier frequency relative to the transmitted carrier frequency caused by the radial velocity (slant range rate) of the target. As the target moves a half wavelength ($\gamma/2$) radially, this frequency difference goes through a 360° phase shift (one doppler cycle). The output of the phase detector which compares the received signal with a representation of the transmitted signal would correspondingly produce one cycle of doppler. If the radial target motion is uniform, which is the normal case, the cycle would be a sine wave. For a pulsed radar of the type considered here, this phase detector output would be a series of pulses with the doppler cycle superimposed as amplitude modulation which is usually sinusoidal.

The upper waveform in FIGS. 1A–I is the result of putting the pulse train, (which has the doppler signals amplitude modulation) through a "boxcar" circuit to increase the energy of the doppler signal. The "boxcar" circuit retains the peak value of each pulse until the next pulse in a manner similar to a "sample and hold" circuit. Each vertical line, then, is the change of value out of the "boxcar" circuit which occurs with each received radar pulse.

Figure 1:
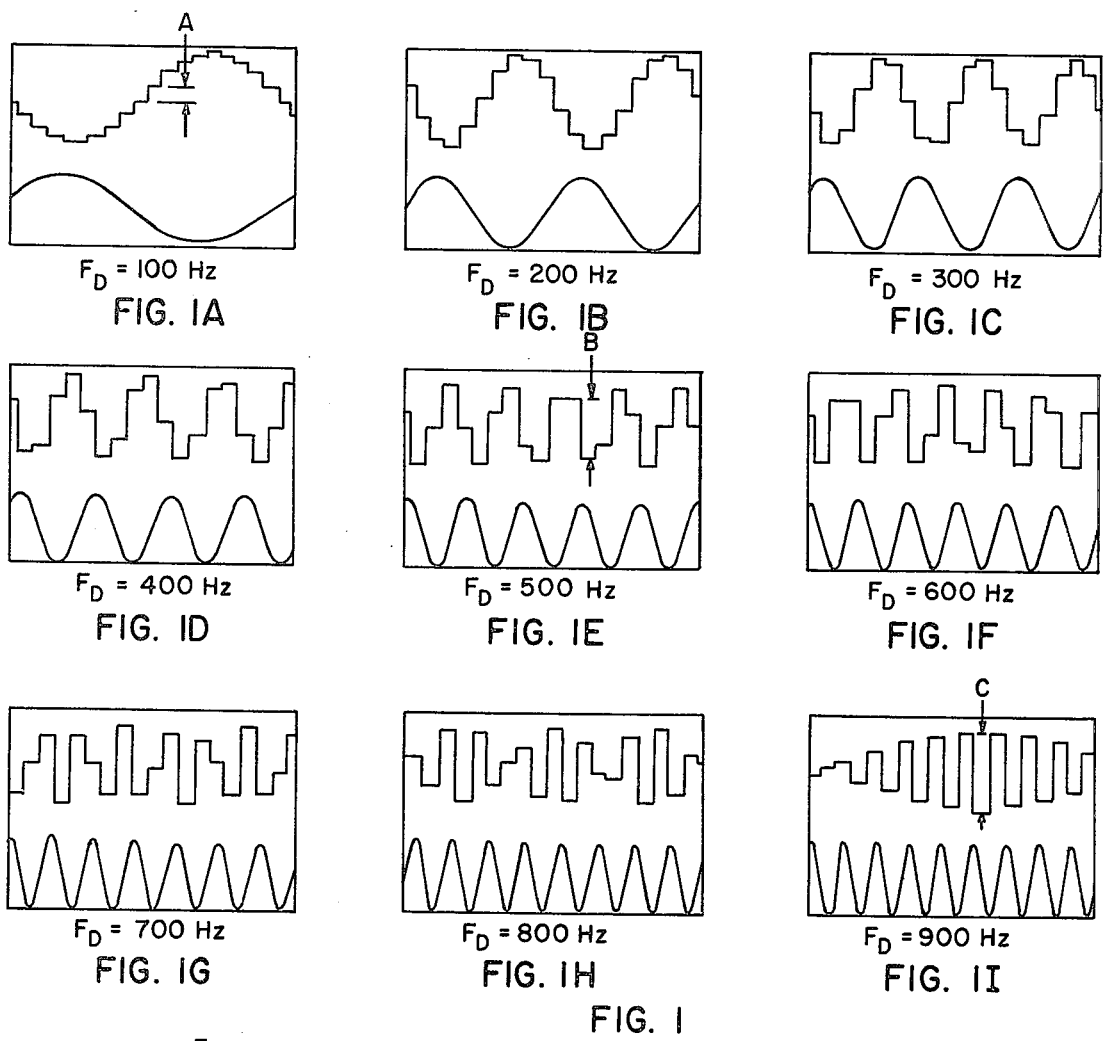
FIGS. 1 A through I shows the staircase type of outputs of the boxcar circuits for various doppler frequencies.

The lower waveform of FIG. 1 is the simulated doppler frequency from the test equipment and is inserted as a phase reference for the tests (180° out phase because of phase detector signal inversion). It represents the actual doppler frequency and has little meaning until the doppler frequency exceeds the radar PRF (pulse repetition frequency).

Figure 2:
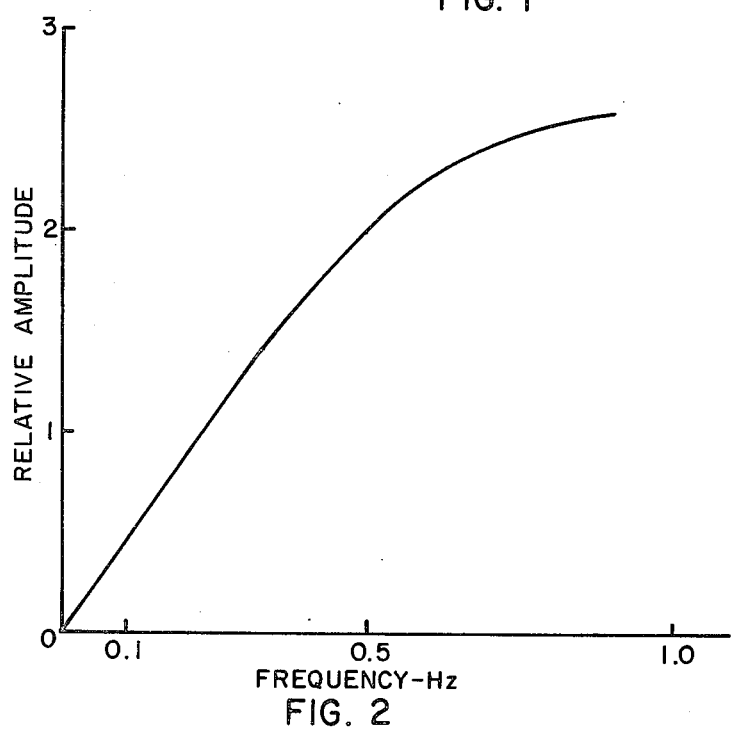
FIG. 2 is a scaling curve showing the relationship between the maximum relative transition amplitude versus the doppler frequency.

The upper waveforms are the boxcar radar doppler frequency signals available for processing. They represent doppler frequencies from 100 Hz to 900 Hz as produced by a radar with a 2 KHz PRF. The principle of this patent is demonstrated in FIG. 1 by identifying the sizes of the largest transition for 3 of the 9 frequencies shown (100 Hz, 500 Hz and 900 Hz) with dimensional arrows. In these 3 examples, the largest transition in the 100 Hz waveform is less than ⅛ inch. That of the 500 Hz waveform is about ⅜ inch and the 900 Hz waveform has a transition of nearly ½ inch. The actual measured data curve is shown in FIG. 2. It can be seen that it becomes asymtotic at 1 KHz, since pulse sampling measurements of sinusoidal waveforms fold (repeat in a mirror image) at frequencies of one half the PRF.

When a radar PRF (Pulse Repetition Frequency) is nearly constant, the maximum pulse-to-pulse difference over one doppler cycle is a good estimate of the doppler frequency. FIG. 1 shows the boxcarred (sample and hold) phase detector pulses from a 2 KHz PRF radar for doppler frequencies from 100 Hz to 900 Hz. It can be seen that the maximum pulse-to-pulse waveform transitions occur at the crossover of the doppler frequency cycle. The three examples, A, B and C show that the maximum transition size increases with frequency. Although the response is nonlinear, particularly as the frequency approaches ½ the PRF value (see FIG. 2), it is nearly linear at the low frequencies where the best definition is required to separate the nearly zero frequency clutter components from the doppler returns of slowly flying targets. It also has the best sensitivity near the crossover point. Therefore, a concept based on this phenomena was originated and applied when a fast doppler frequency measurement was required from a short (4 pulse) search sample. (The sample-to-sample transients dominated the doppler filter responses for these short samples and adequate doppler frequency measurements were not practical after passing the search signal through the doppler bandpass filter). The preferred implementation peak-reads the transitions during the sample time (which exceeded ½ cycle of the lowest doppler of interest, thus insuring at least one doppler zero crossing per sample) generates an analog voltage indicating frequency from these peak values. (This technique can also be applied digitally by digitally defining the maximum pulse-to-pulse amplitude change). Provisions were also incorporated in the circuitry to measure four different sequential samples at different PRF intervals and to select the largest response. This sample, then, was identified as providing the optimum radar doppler response, since the folding of video bandpass doppler frequencies makes the signal nearest the center of the filter bandpass have the highest indicated doppler frequency.

The purpose of this pulse repetition interval (PRI) selector is to use the staircase waveform as a search acquisition function for selection of the optimum PRI for a given target doppler velocity. The concept is to use the boxcar transition value which occurs as the sinusoidal waveform passes through zero. Characteristics of this kind of sampling are shown by the samples labeled A, B and C on the 100 Hz, 500 Hz, 900 Hz in FIG. 1. For the low frequency, indicated by sample A, small transition times occur at this crossover. These increase nearly linearly with frequency up to the sample shown as B in the 500 Hz waveform. The output of higher frequencies tend to compress due to the sinusoidal nature of the sampled waveform but can continue to evidence a sensible difference up to the value indicated by sample C in the 900 Hz picture. The scaling curve generated by sensing the maximum transitions as a function of frequency is shown in FIG. 2. It should be noted that this curve represents the values of the peak transitions for each frequency. Very good sensitivity results for low frequencies with reduced sensitivity for the highest 100 to 200 cycles. It also should be noticed that the upper end of the scaling curve will change as a function of the sampling frequency. Therefore, this curve would have a varying upper value for each of the four PRIs used in the staircase.

Figure 3:
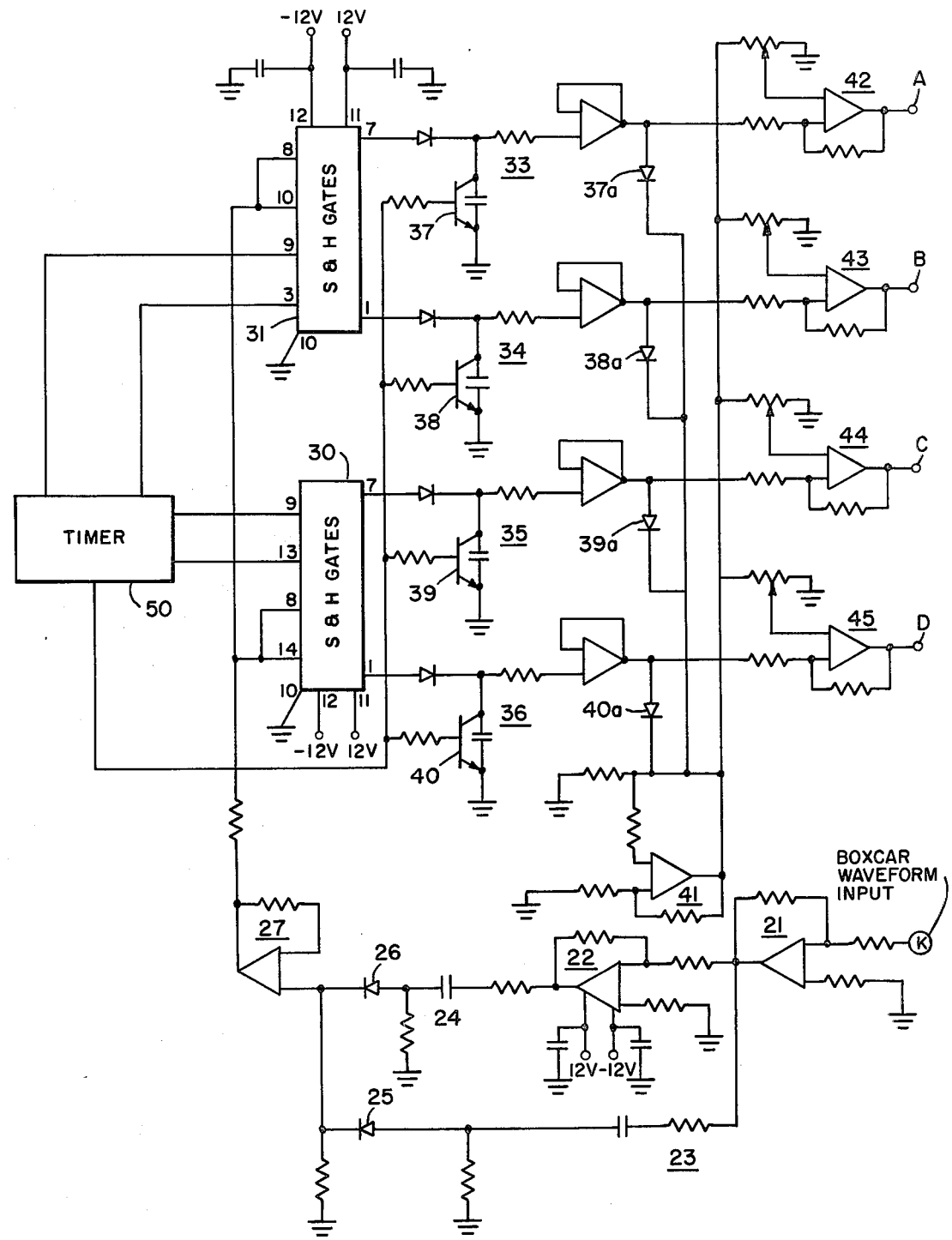
FIG. 3 is a block diagram showing a preferred embodiment of the present invention in which four groups of pulses with different radar pulse repetition intervals $(RR-T_2)$ are sent sequentially to avoid synchronous sampling at specific doppler frequencies.

A selector unit shown in FIG. 3 has been implemented to use the peak value of a staircase search waveform transitions. This is accomplished by differentiating the boxcar waveform input to get a train of pulses whose amplitude corresponds to the amplitude of the boxcar transitions, dividing this train into four channels corresponding to the four PRIs of the staircase waveform, and putting each channel into a separate peak-reading "sample and hold" circuit. The results are four dc voltages whose values are proportional to the filter response frequency for each of these channels. The highest voltage of these four is used as the reference voltage for four comparators, one for each staircase PRI channel. The gains of the individual channels are adjusted to account for the difference of the peak voltage amplitude corresponding to each PRI. These four comparators, then, operate on the four output voltages using the largest voltage as the reference in order to select the maximum value. Since the sensitivity reduces at the higher frequencies, corresponding to the center of the unstaggered or destaggered passband, the comparator circuit response incorporates some hysteresis so that more than one channel may be indicated as satisfactory when several channels have a high output frequency.

A search is automatically actuated for an arbitrarily selected one second search time to ensure maximization of the peak transition values in each channel. The outputs of the comparators go to "open collector" output gates activated by a short pulse following the one second search time. The output of these gates goes directly to switch contacts and act exactly the same as a physical switch closing to select a predefined operational radar PRI. In addition, a latch operates on the pulses after the one-second search time in order to operate four indicator lights on a selector unit. This action provides an indication of which channels are selected and are acceptable in a multiple PRI selection situation even though only the highest priority one is actually automatically selected.

The boxcar waveform K of FIG. 3 is buffered by an operational amplifier 21 which also brings the level of the staircase up to a suitable amplitude. This waveform is inverted by a second operational amplifier 22 so that it and the inverted waveform can be used to double the number of waveform transition samples available (absolute value circuit). Boxcar differentiating networks 23 and 24 provide differentiated pulses. These pulses are fed through diodes 25 and 26 so as to give absolute value. Then the pulses are buffered by another operational amplifier 27 and fed as inputs to analog gates 30 and 31 which sequentially route the pulses into the four discrete channels A,B,C and D corresponding to the timing of the staircase pulses by timer 50. The outputs of the four analog channels are fed to individual "sample and hold" circuits 33–36 each comprised of a diode, a capacitor and a high impedance buffer operational amplifier. Transistors 37–40 across each sampling capacitor discharges it at the completion of the one-second period as determined by timer 50.

The outputs of the buffer operational amplifiers 33–36 are fed through diodes 37a–40a to pick the maximum value from among the four "sample and hold" outputs. This maximum value is buffered by another operational amplifier 41 and provides the reference voltage to the four output comparators 42–45. This will allow an output only from the channel having the highest value, as amplifiers not receiving this value will be biased off.

The outputs of amplifiers 42 through 45 could be fed to a plurality of AND gates which would be then triggered on by the timer 50 after all the sampling holds circuits have been activated and the true highest value is determined. The gates 30 and 31 could be AH0152 chips or any of the other well known gating circuits. The timer 50 could be made up of sequential timers in accordance with the design requirements and could be made responsive to radar cycles.

I claim:

1. In a system having a staircase waveform signal which is amplitude modulated in essentially a sinusoidal manner, the improvement comprises a method of rapidly determining the frequency of the sinusoidal waveform by the steps of: differentiating the staircase waveform signals so as to get a train of pulses whose amplitude corresponds to the waveform; dividing this train into a plurality of channels; utilizing a sample and hold circuit each channel to retain the amplitude of the pulse in that channel; selecting the highest valued pulse in the sampling and hold circuits; and using the pulse amplitude to define the sinusoidal waveform frequency.

2. A method as set forth in claim 1 further comprising the steps of determining the optimum sampling frequency for a given sinusoidal modulation frequency; and dividing the train into separate channels each of which corresponds to a selected dampling frequency.

3. A method as set forth in claim 2 further comprising the steps of providing comparators for each channel; and comparing the highest pulse value with the pulse in each channel and transmitting a signal only when the two are equal.

4. A method as set forth in claim 1 or 3 wherein the system is a MTI radar system; and further comprising the step of determining and selecting the optimum PRI as a function of target doppler frequencies on a real time basis without waiting for the doppler frequency filters to settle.

* * * * *